United States Patent

Okado et al.

[11] Patent Number: 6,144,808
[45] Date of Patent: *Nov. 7, 2000

[54] CAMERA HAVING APPARATUS FOR ENHANCING SIGNAL-TO-NOISE RATIO IN READING A FILM MAGNETIC RECORDING PART

[75] Inventors: Teruyuki Okado, Tokyo; Yuuichi Matsuda, Yokohama; Ken Kamiya, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,265

[22] Filed: Sep. 24, 1997

[30] Foreign Application Priority Data

Oct. 1, 1996 [JP] Japan .................................. 8-278609
Dec. 27, 1996 [JP] Japan .................................. 8-350496

[51] Int. Cl.$^7$ .............................. G03B 17/24; G03B 1/00
[52] U.S. Cl. ........................................... 396/319; 396/406
[58] Field of Search .................................. 396/210, 310, 396/319, 387, 389, 390, 392, 406

[56] References Cited

U.S. PATENT DOCUMENTS 4,055,849  10/1977  Hickok ........................................ 360/77
5,614,969   3/1997  Izukawa .................................... 396/319

Primary Examiner—David M. Gray
Attorney, Agent, or Firm—Robin, Blecker & Daley

[57] ABSTRACT

Apparatus for enhancing signal-to-noise ratio in reading a film magnetic recording part includes a reproducing device which reproduces a signal recorded on the magnetic recording part of the film and a signal processing device which performs at least one of causing the reproducing device not to reproduce the signal and disabling the signal reproduced by the reproducing device, in at least one of a case where a predetermined signal is included in the signal reproduced by said reproducing device during transportation of the film and a case where the presence and time position of the predetermined signal in the signal reproduced by said reproducing device during transportation of the film are predicted.

14 Claims, 14 Drawing Sheets

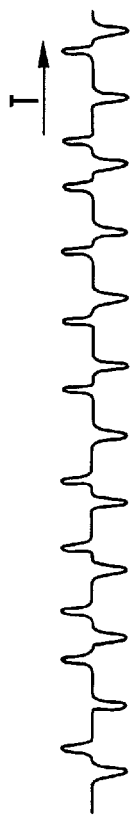
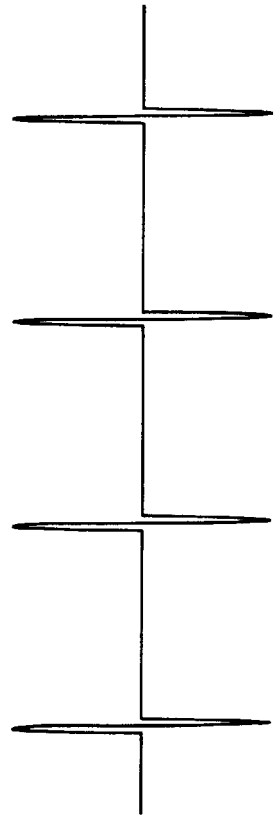
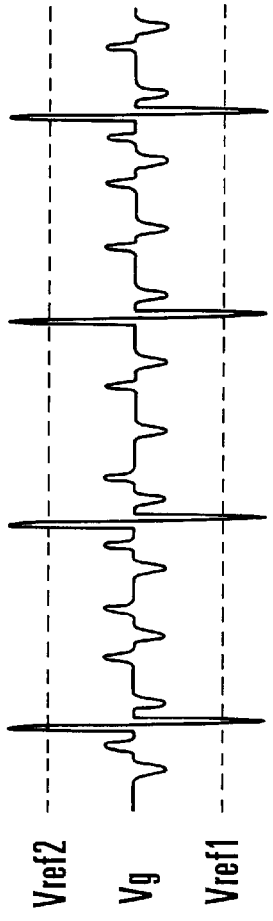
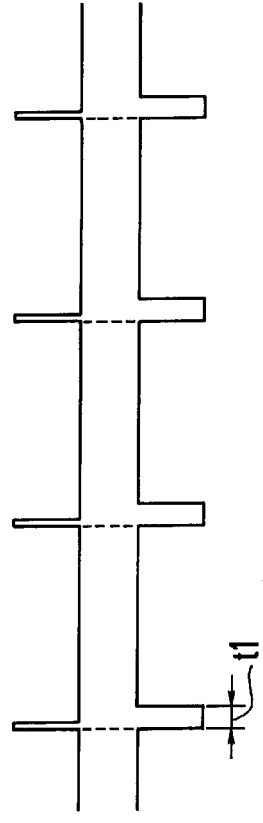
FIG.4(a)
FIG.4(b)
FIG.4(c)
FIG.4(d)
FIG.4(e)

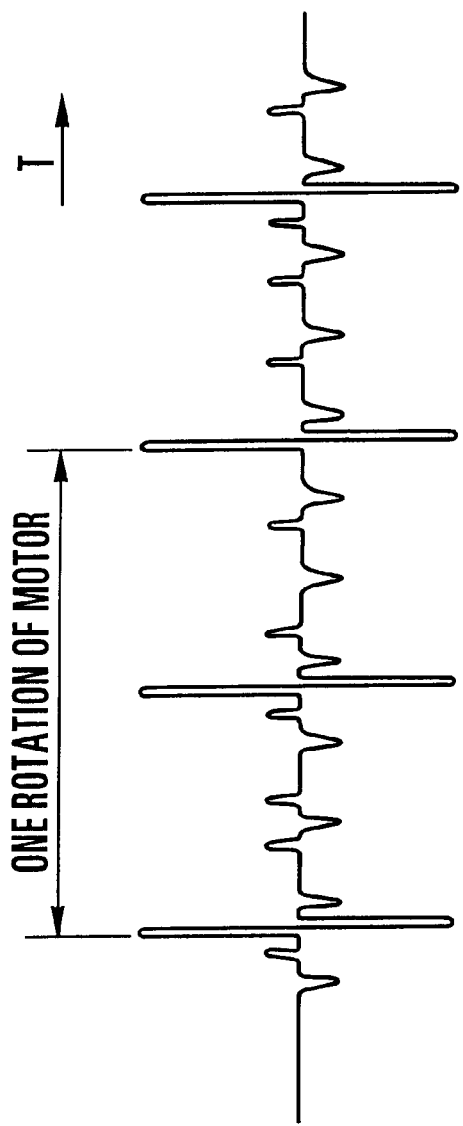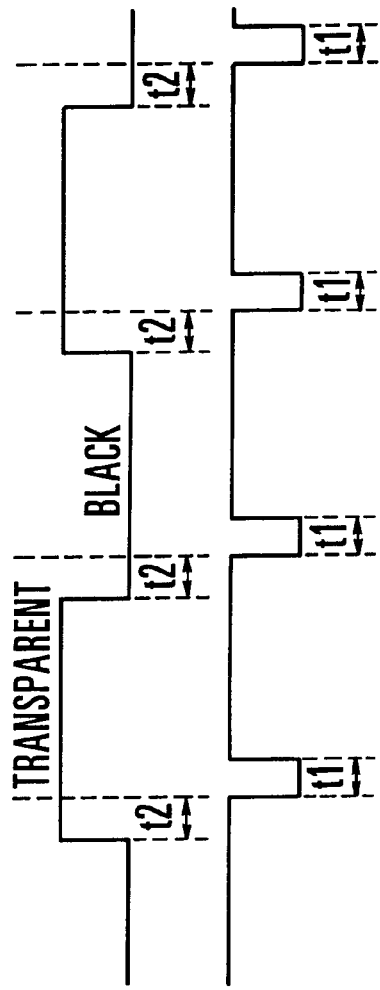
FIG.10(a) Vg'
FIG.10(b) PI
FIG.10(c) A/DEN

CAMERA HAVING APPARATUS FOR ENHANCING SIGNAL-TO-NOISE RATIO IN READING A FILM MAGNETIC RECORDING PART

BACKGROUND OF THE INVENTION

1. Field of the Invention

The present invention relates to an apparatus such as a camera which permits loading thereon and use of a film having a magnetic recording part for recording thereon information about the film, information on camera photography, etc., and more particularly to an apparatus arranged to prevent errors in reading magnetically reproduced signals.

2. Description of Related Art

There is known a camera arranged to use a film cartridge which has a film completely contained therein including a leader part, to permit film rewinding (taking out) halfway and to permit reloading and reuse of a film cartridge taken out, as disclosed in U.S. Pat. No. 4,878,057. Further, a film cartridge arranged to indicate its state, such as an unused state, a currently-in-use state or a used state, was proposed in U.S. Pat. No. 4,965,600. In addition, the art of providing a magnetic recording part on a film and reproducing and recording information on the film or information on camera photography was disclosed in U.S. Pat. No. 4,864,332.

A camera using a film of the above-stated kind is arranged to detect exposure information from a visual exposure indication (VEI) provided on the film cartridge and also from magnetic information recorded on the film. By virtue of this arrangement, a photo-taking operation can be resumed on a film which has been rewound halfway in use, by loading the film again on the camera and setting an unexposed (unused) portion of the film on the camera.

A camera of the above-stated kind is arranged to discriminate between an exposed frame and an unexposed frame in a film in which magnetic information has been recorded on the exposed frames, by detecting the magnetic information recorded on the film, in setting an unexposed portion of the film with the film reloaded on the camera after the film has been rewound halfway in use. In the case of the camera of this kind, a spike-like magnetic noise caused by a film transport motor while the camera is in process of detecting the magnetic information from the film tends to prevent the magnetic information from being accurately detected. The spike-like magnetic noise thus has presented a serious problem.

To solve this problem, there has been proposed in Japanese Laid-Open Patent Application No. HEI 4-246638 an arrangement for canceling the spike-like magnetic noise by using a delay circuit for a signal obtained by binary-coding an analog magnetic signal. However, when the level of noise other than the spike-like motor magnetic noise is large or the level of magnetic information itself is small, such proposed arrangement not only makes it difficult to set a comparison voltage for a comparator to be used in binary-coding the analog signal but also tends to make discrimination between an unexposed frame and an exposed frame difficult as the magnetic information cannot be accurately detected.

If a camera is required to simply discriminate between an exposed frame and an unexposed frame, the camera can be arranged to detect the presence or absence of a magnetic record instead of reading the contents of information recorded. In that case, an analog signal value of a magnetic information signal is continuously A/D (analog-to-digital) converted for a predetermined period for each of frames to obtain a standard deviation of a plurality of A/D-converted values, and the value of the obtained standard deviation is compared with a prestored standard deviation of A/D-converted values of a frame in which no magnetic information is recorded. Then, each frame is checked to find if magnetic information is recorded for the frame according to the result of the comparison. If so, the frame is determined to be an exposed frame. An unexposed frame thus can be detected by utilizing the fact that the level of a signal differs between the frame in which magnetic information is recorded and the frame in which no magnetic information is recorded.

The above-stated prior art arrangement employs a method of obtaining the standard deviation of A/D converted values. However, although unexposed frames can be found or indexed at a fairly high probability by the above-stated method, the spike-like magnetic noise caused by the film transport motor is also necessarily A/D-converted. Therefore, according to the above-stated method, it is hardly possible to completely remove the adverse effect of the spike-like magnetic noise. Then, depending on the degree of the adverse effect of the spike-like magnetic noise, the magnetic noise might cause the exposed state of the film in use to be erroneously detected, such that an unexposed frame is mistaken for an exposed frame, thereby making an accurate indexing action for unexposed frames hardly possible.

Further, the adverse effect of the motor noise mentioned above can be mitigated by arranging the motor away from a magnetic head. However, a strong desire which generally exists for reduction in size of a camera imposes a limit on a physically allowable space between the magnetic head and the motor. Therefore, the noise in question cannot be sufficiently mitigated.

BRIEF SUMMARY OF THE INVENTION

In accordance with one aspect of the invention, there is provided an apparatus such as a camera adapted to a film having a magnetic recording part, which comprises a reproducing device which reproduces a signal recorded on the magnetic recording part of the film, and a signal processing device which performs at least one of causing the reproducing device not to reproduce the signal and disabling the signal reproduced by the reproducing device, in at least one of cases where a predetermined signal is included in the signal reproduced by the reproducing device during transportation of the film and where it is predicted that the predetermined signal is included in the signal reproduced by the reproducing device during transportation of the film, so that the signal recorded on the magnetic recording part of the film can be accurately detected.

The above and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 4(a) to 4(e) show waveforms of signals obtained at various parts of the magnetic reproduction circuit shown in FIG. 3.

FIGS. 10(a) to 10(c) show waveforms of signals obtained at various parts of the magnetic reproduction circuit shown in FIG. 9.

DETAILED DESCRIPTION OF THE INVENTION

Hereinafter, preferred embodiments of the invention will be described in detail with reference to the drawings.

Figure 1:
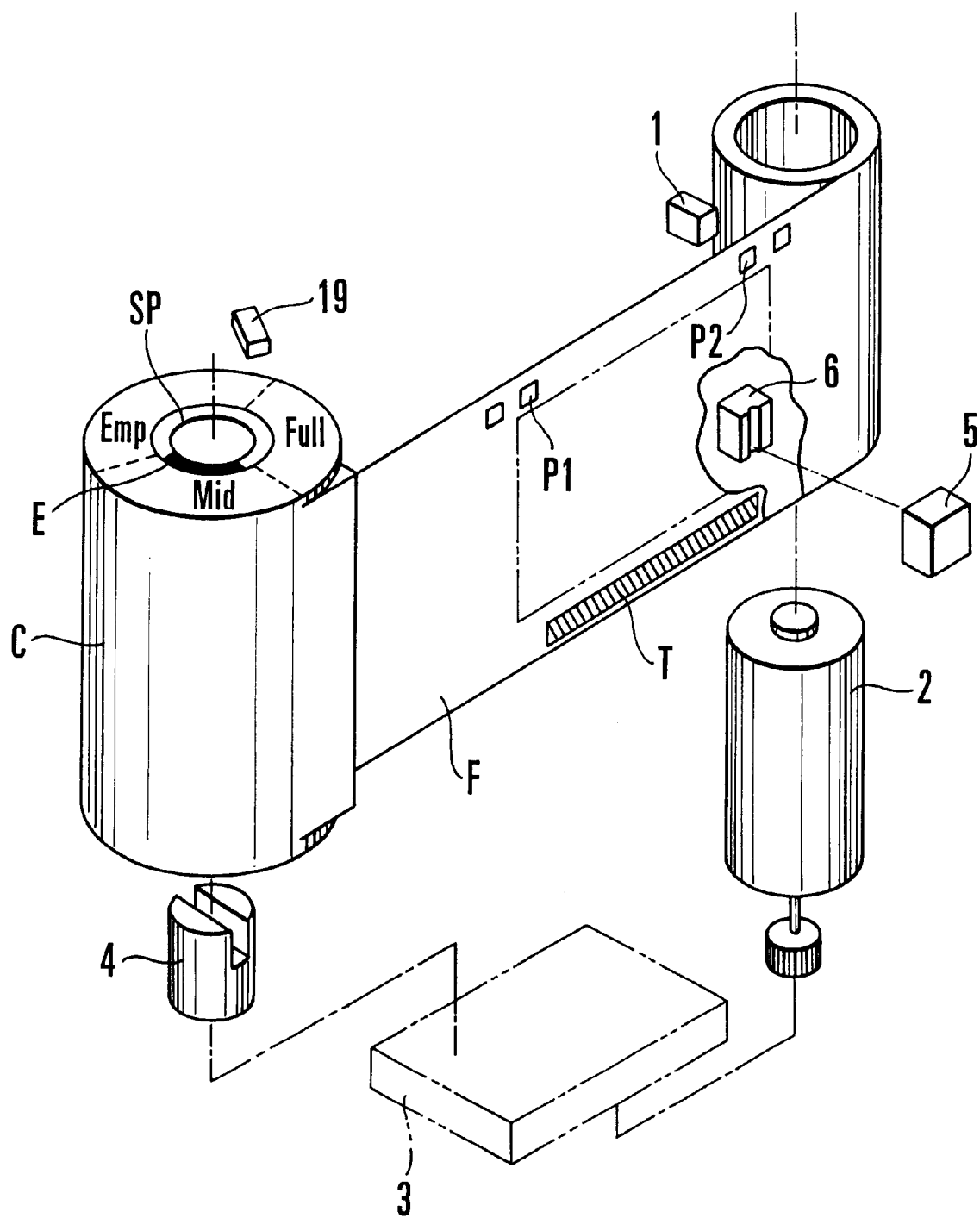
FIG. 1 is an exploded perspective view showing some essential parts of a camera arranged according to the invention as a first embodiment thereof.
Figure 2:
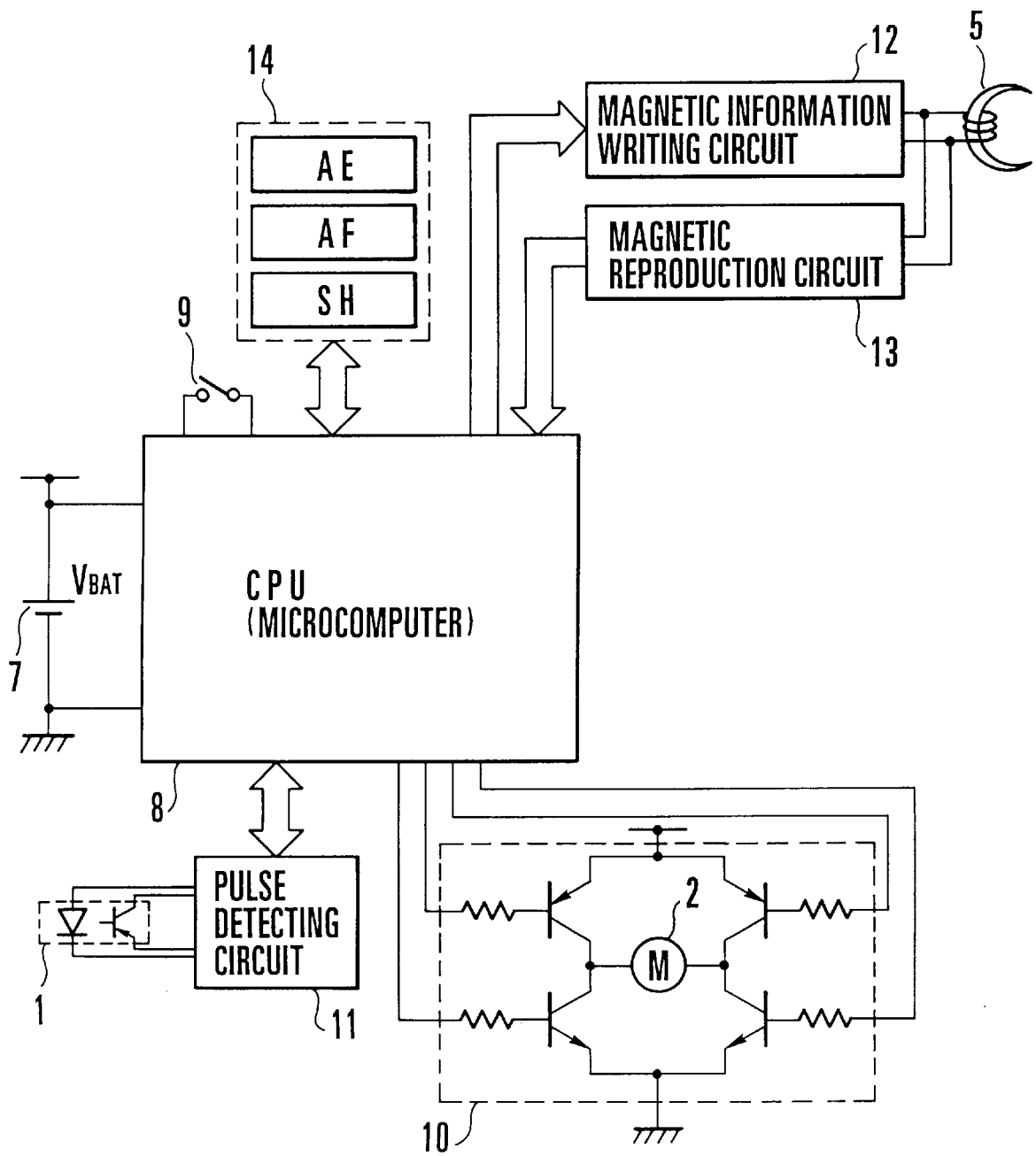
FIG. 2 is a block diagram showing the arrangement of an electric control system of the camera shown in FIG. 1.
Figure 3:
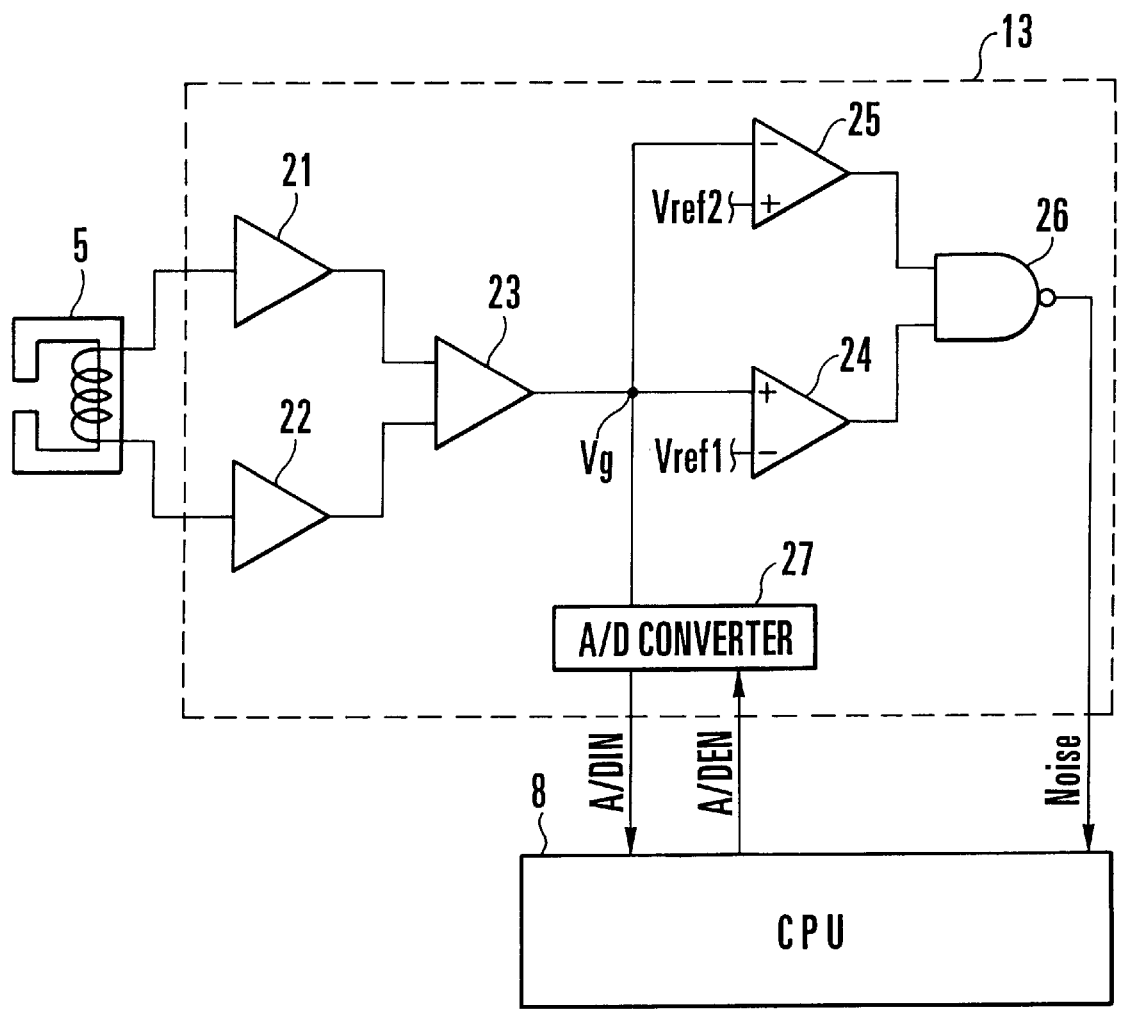
FIG. 3 is a block diagram showing the arrangement of a magnetic reproduction circuit shown in FIG. 2.
Figure 5:
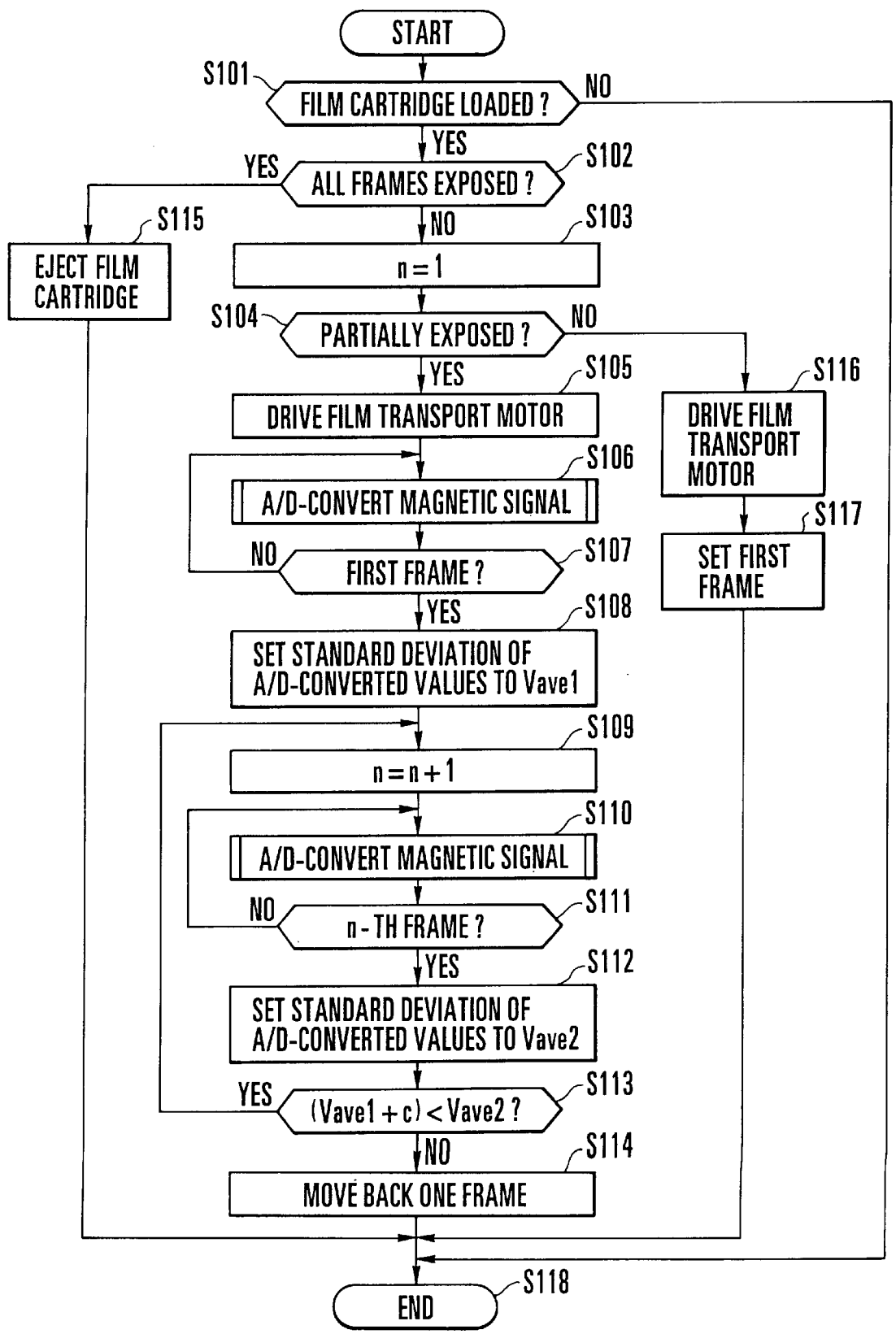
FIG. 5 is a flow chart showing the flow of a film cartridge loading operation of a microcomputer 8 shown in FIG. 2.
Figure 6:
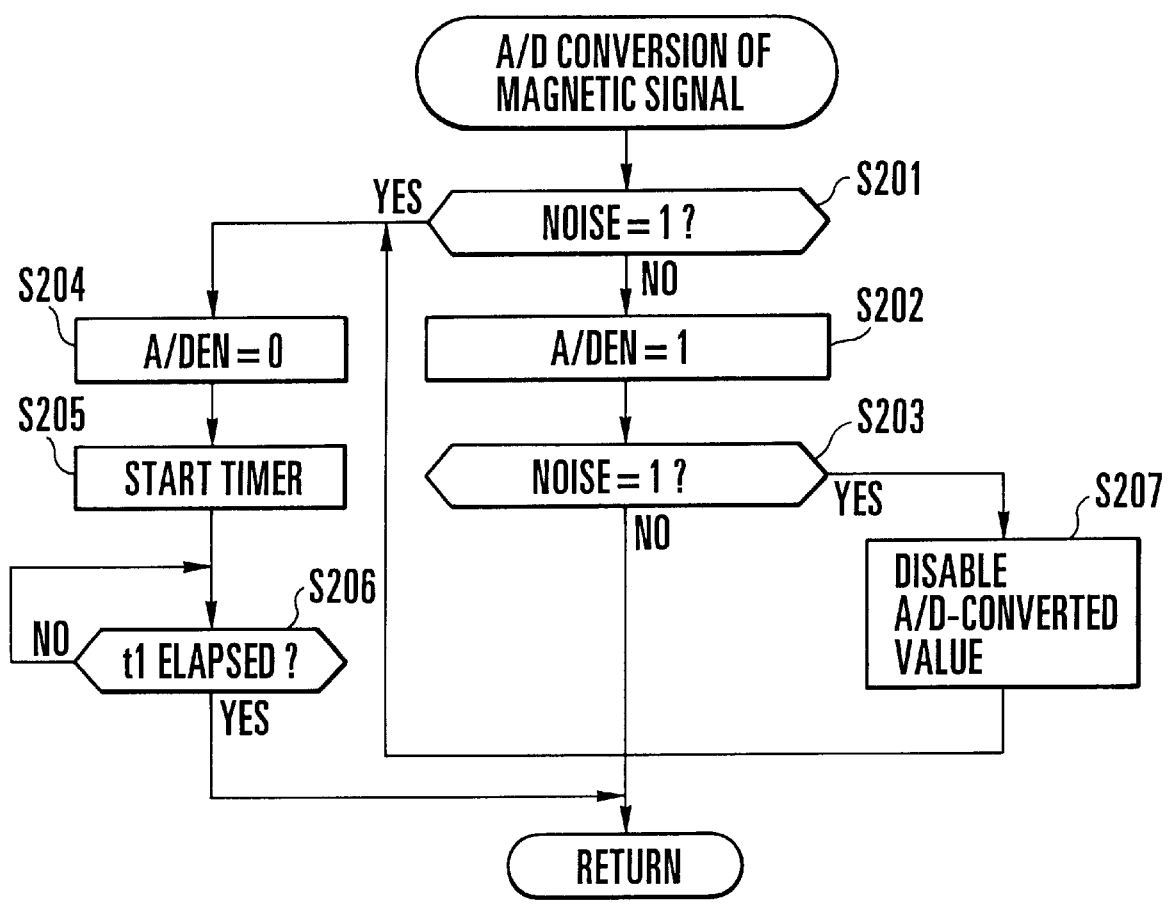
FIG. 6 is a flow chart showing in detail an A/D converting action shown in FIG. 5.

FIGS. 1 to 6 are diagrams which relate to a camera arranged as a first embodiment of the invention. Among FIGS. 1 to 6, FIG. 1 is an exploded perspective view showing some essential parts of the camera. FIG. 2 is a block diagram showing an electric control system of the camera shown in FIG. 1. FIG. 3 is a block diagram showing a magnetic reproduction circuit shown in FIG. 2. FIGS. 4(a) to 4(e) show waveforms of signals obtained at various parts of the magnetic reproduction circuit shown in FIG. 3. FIG. 5 is a flow chart showing a film cartridge loading operation of a microcomputer 8 shown in FIG. 2. FIG. 6 is a flow chart showing in detail an A/D converting action shown in FIG. 5.

Referring to FIG. 1, a film transport photo-reflector 1 is provided for transporting a film F to a predetermined extent by detecting the perforations P1 and P2 of the film F. A film transport motor 2 is disposed within a spool. A gear mechanism 3 is arranged to effect speed reduction and switching between film winding and rewinding actions. A fork 4 is provided for rewinding the film F. A magnetic head 5 is arranged to write and read information into and from a track T provided on the film F. A pressure pad 6 is arranged to push the film F against the magnetic head 5.

A film cartridge C contains the film F therein in a coiled state. A magnetic layer is applied to the film F on the base side thereof. The film F is provided with a track T which is formed along one side edge of the film F for recording data relating to exposure conditions, frame numbers, etc., as magnetic information. The perforations P1 and P2 are formed in the other side edge of the film F in positions corresponding to a photo-taking image plane.

A film-using-state indicating mark E is disposed on the upper surface of the film cartridge C (on one end surface of a film spool SP) to indicate a state of use of the film F by its position relative to the film cartridge C. A photo-reflector 19 is disposed above the film cartridge C to detect the position of the film-using-state indicating mark E.

Referring to FIG. 2, a CPU 8 is arranged to drive and control the whole electric control system. The power for the operation of the CPU 8 is supplied from a battery 7. To the CPU 8, there are connected, besides the battery 7, a release switch 9 which turns on at the commencement of a photo-taking operation, a film transport circuit 10 which is arranged to cause the film F to be wound and rewound, a pulse detecting circuit 11 which is arranged to turn a detection signal of the film transport photo-reflector 1 into a signal acceptable by the CPU 8, a magnetic information writing circuit 12 arranged to send a signal for recording by the magnetic head 5 photo-taking information or the like in the track T of the film F, a magnetic reproduction circuit 13 arranged to read magnetic information written in the track T of the film F, an AE/AF/SH circuit 14 arranged for automatic exposure (AE), automatic focusing (AF) and shutter opening and closing actions, and so on.

Referring to FIG. 3 which shows in detail the magnetic reproduction circuit 13 shown in FIG. 2, a magnetic signal recorded on the film F is reproduced by the magnetic head 5. The reproduced signal is inputted from the magnetic head 5 to amplifiers 21 and 22 to be amplified there. Two amplification outputs from the amplifiers 21 and 22 are inputted to a differential amplifier 23. At the differential amplifier 23, these inputs are processed to have their in-phase portions (offset portions) removed and to be amplified. A signal outputted from the differential amplifier 23 as a result of the process is sent to an A/D converter 27 and also to one input terminal of each of comparators 24 and 25. The A/D converter 27 then A/D-converts the output of the differential amplifier 23 into a digital signal. The comparators 24 and 25 are arranged to determine the reproduction level of the magnetic signal received. At the other input terminal of each of the comparators 24 and 25, a comparison voltage is set at a value which is obtained by offsetting, by a predetermined level, the normal input level of the magnetic signal for the purpose of detecting a magnetic noise. The comparators 24 and 25 are thus respectively arranged to have comparison voltages Vref1 and Vref2 which are in a relation of "Vref1<Vref2". At the comparator 24 and 25, the input magnetic signals are thus compared with the comparison voltages Vref1 and Vref2, respectively.

The outputs of the comparators 24 and 25 are inputted to a NAND gate 26. The NAND gate 26 is arranged to output a signal at a high level ("1") when a magnetic signal Vg outputted from the differential amplifier 23 is lower than the comparison voltage Vref1 or higher than the comparison voltage Vref2. The output of the NAND gate 26 and the output of the A/D converter 27 are supplied to the CPU 8. The A/D conversion by the A/D converter 27 is allowed to be performed when an A/D conversion enabling signal A/DEN from the CPU 8 is at "1", and inhibited when the A/D conversion enabling signal A/DEN is at "0".

FIGS. 4(a) to 4(e) show the waveforms of signals obtained at various parts of the circuit shown in FIG. 3. In each of FIGS. 4(a) to 4(e), the abscissa axis shows time T. The output Vg of the differential amplifier 23 takes various waveforms as shown in FIGS. 4(a), 4(b) and 4(c). FIG. 4(a) shows an ideal reproduced waveform obtained when no noise is included in the reproduced magnetic signal. FIG. 4(b) shows a reproduced waveform obtained when no magnetic signal is recorded on the film F and an adverse effect of a noise caused by the film transport motor 2 appears. FIG. 4(c) shows a reproduced waveform obtained when a magnetic signal is recorded on the film F and the reproduced magnetic signal is affected by a noise caused by the film transport motor 2.

FIG. 4(d) shows an output NOISE of the NAND gate 26 in FIG. 3 obtained when a reproduced waveform is in the shape of FIG. 4(c). FIG. 4(e) shows the waveform of the A/D conversion enabling signal A/DEN outputted from the CPU 8. The motor noise is strongly generated at a certain angle of rotation of the film transport motor 2. As apparent from FIGS. 4(b) and 4(c), the motor noise is generated in a periodic manner. Further, as apparent from FIG. 4(c), the motor noise has a much greater amplitude than the waveform of a normal magnetic signal.

According to the arrangement of the first embodiment, as shown by the waveforms in FIGS. 4(c), 4(d) and 4(e), the output NOISE of the NAND gate 26 becomes "1" when the level of the magnetic signal Vg outputted from the differential amplifier 23 is caused by the noise to become lower than the comparison voltage Vref1 or higher than the comparison voltage Vref2. Then, the state "1" of the output NOISE of the NAND gate 26 causes the CPU 8 to output the signal A/DEN at "0". The state "0" of the signal A/DEN of the CPU 8 inhibits the A/D converter 27 from performing A/D conversion for a predetermined period of time t1, in such a way as to prevent A/D conversion of any noise portion of the reproduced magnetic signal. In other words, a standard deviation of a plurality of A/D-converted values from which the motor noise is removed is obtained and used to improve the accuracy of detection of magnetic information, so that unexposed frames of the film F can be effectively prevented from being mistaken.

With the first embodiment arranged as described above, the CPU (microcomputer) 8 operates as described below with reference to FIGS. 5 and 6.

FIG. 5 is a flow chart showing a cartridge loading operation to be executed until a photographable (unexposed) frame of the film F is automatically set in place after the camera is loaded with the film cartridge.

Referring to FIG. 5, at a step S101, a check is made by a known film cartridge detecting means to find if the camera is loaded with the film cartridge. If not, the flow of operation comes to an end. If so, the flow proceeds to a step S102. At the step S102, a check is made for the film-using-state indication, that is, for the visual exposure indication (VEI) as mentioned in the foregoing. If the VEI indicates either that the film has been completely exposed or that the film has been developed, the flow comes to an end through a step S115 of ejecting the film cartridge. If not, the flow proceeds to a step S103. At the step S103, the count number of a number-of-frames determining counter is set at "1" (n=1). At the next step S104, a check is made to find whether the film as loaded is unexposed or has been partially exposed. In the case of the film being unexposed, the flow of operation proceeds to a step S116. At the step S116, the film transport motor 2 is driven. When the first frame of the film is detected by the film transport photo-reflector 1, the motor 2 is brought to a stop. Then, at a step S117, the first frame of the film is set in the position of a photo-taking frame, and the flow comes to an end.

If the film is found at the step S104 to have been partially exposed, the flow of operation proceeds to a step S105. At the step S105, the film transport motor 2 is driven. At the next step S106, a magnetic signal is A/D-converted. At a step S107, a check is made to find if the film has reached the position of the first frame. If not, the flow returns to the step S106 to repeat the A/D converting step. The details of the A/D conversion will be described later.

At a step S108, with the film set at the first frame, the standard deviation of a plurality of A/D-converted values obtained at the step S106 is obtained and set as a value "Vave1". In other words, data for the magnetic signal (for a no-signal-recorded portion where no magnetic signal is recorded on the film) obtained before the film is set in the position of the first frame is obtained at the steps S106, S107 and S108.

At the next step S109, the count number n of the number-of-frames determining counter is incremented by one (n=n+1), and the film is further transported to the next frame position. At a step S110, a magnetic signal is A/D converted. At a step S111, a check is made to find if the film has reached the position of the n-th frame (the second frame in this instance). If not, the flow returns to the step S110 to repeat the step of A/D conversion. If so, the flow proceeds to a step S112. At the step S112, with the film set in the n-th frame position, the standard deviation of a plurality of A/D-converted values obtained at the step S110 is obtained and set as a value "Vave2". Data for the magnetic signal for a frame ((n−1)-th frame) obtained before the film is set in the position of the n-th frame is obtained at the steps S110 to S112.

At a step S113, a value obtained by adding a predetermined level "c" to the magnetic signal data of the no-signal-recorded portion obtained at the step S108 (Vave1+c) is compared with the magnetic signal data of the (n−1)-th frame obtained at the step S112 (Vave2). If the result of comparison shows "(Vave1+c)<Vave2", thus indicating that a magnetic signal is recorded at the (n−1)-th frame and that the (n−1)-th frame is an exposed frame, the flow returns to the step S109 to repeat the steps S109 to S113. If the result of comparison is not "(Vave1+c)<Vave2", thus indicating that no magnetic signal is recorded at the (n−1)-th frame and that the (n−1)-th frame is an unexposed frame, the flow proceeds to a step S114. At the step S114, the film which is currently set in the n-th frame position is moved back to the (n−1)-th frame position, and then the flow comes to an end at a step S118.

The details of the A/D converting step S106 or S110 are next described with reference to the flow chart of FIG. 6.

Referring to FIG. 6, at a step S201, a check is made for the state of the signal NOISE outputted from the NAND gate 26. If the signal NOISE is found to be at "1" (NOISE=1) which indicates existence of a noise, the flow proceeds to a step S204. At the step S204, the CPU 8 sets the signal A/DEN to "0". At a step S205, the CPU 8 causes the timer to start its time count. At a step S206, the A/D converting action is inhibited for a period of time t1, and the flow of operation comes to an end. Further, if the signal NOISE is found at the step S201 to be at "0" thus indicating that the reproduced magnetic signal is a normal signal including no noise, the flow of operation proceeds to a step S202. At the step S202, the signal A/DEN is set to "1" to allow the A/D converting action to be performed. After the A/D conversion, the flow proceeds to a step S203. At the step S203, a check is made again for the state of the signal NOISE. If the signal NOISE is found to be at "0", the flow comes to an end. If the signal NOISE is found to be at "1" thus indicating existence of a noise, the flow proceeds to a step S207. At the step S207, an A/D-converted value obtained at the step S202 is disabled. The flow then proceeds to the step S204 to inhibit the A/D conversion for the period of time t1 before the flow comes to an end.

According to the arrangement of the first embodiment, as described above, the state of use of the film is found when the camera is loaded with the film cartridge. Then, in a case where the film is to be automatically set in an unexposed frame position by examining the reproduced signal of magnetic information, if a noise such as a magnetic noise or the like is detected by the detecting circuit composed of the comparators 24 and 25, etc., the steps 204, S205 and S206 are executed to inhibit A/D conversion for the predetermined period of time t1 or the step S207 is executed to disable the A/D-converted value obtained before. Accordingly, any reproduced signal that has a low reliability including a noise is positively discarded to selectively output only a reproduced signal of a high reliability. Therefore, in the first embodiment, unexposed frames are discriminated from exposed frames not on the basis of any reproduced signal that includes a noise, so that any misjudgement for an unexposed frame can be prevented.

Next, a second embodiment of the invention is described.

Figure 7:
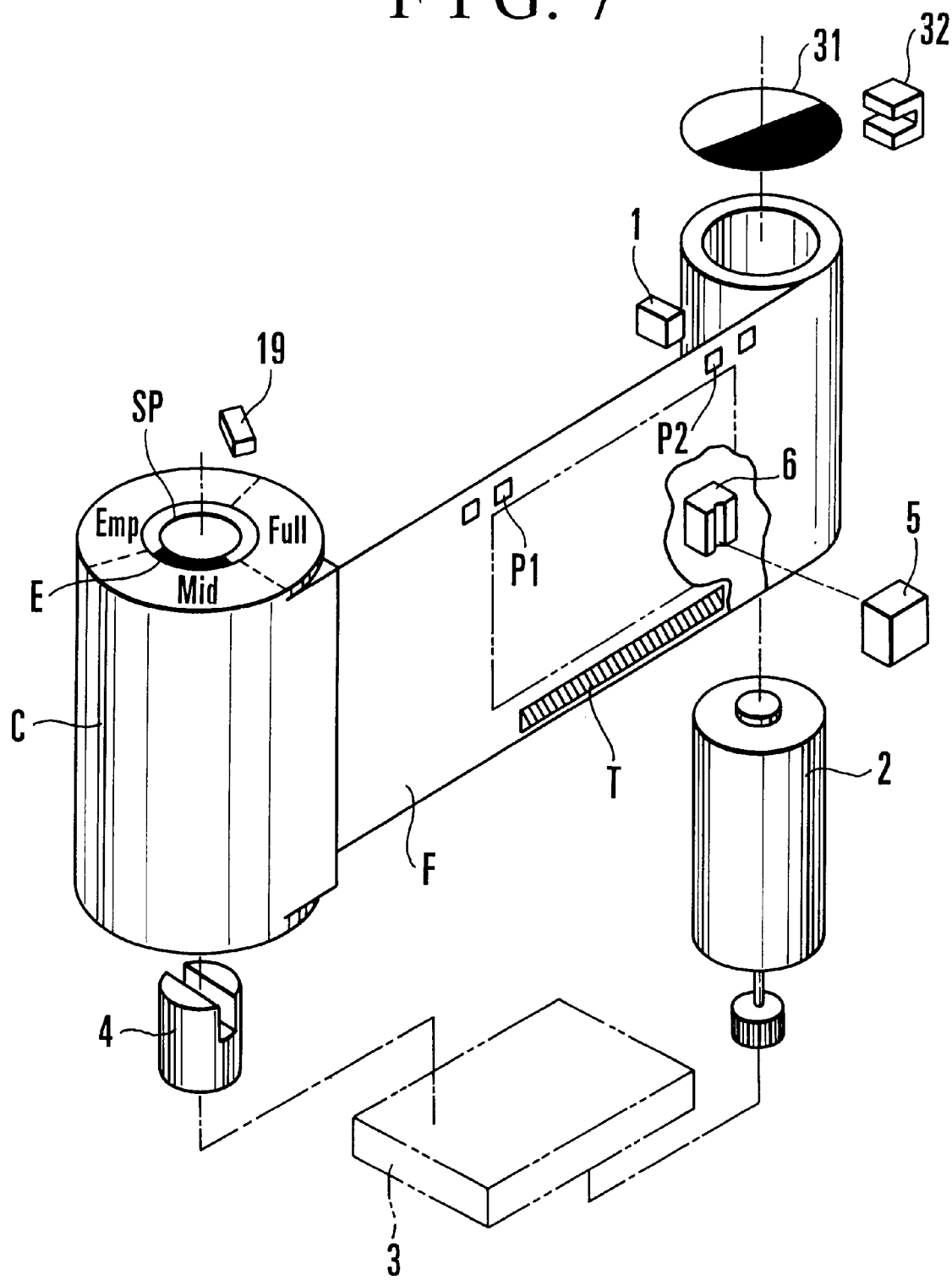
FIG. 7 is an exploded perspective view showing some essential parts of a camera arranged according to the invention as a second embodiment thereof.
Figure 8:
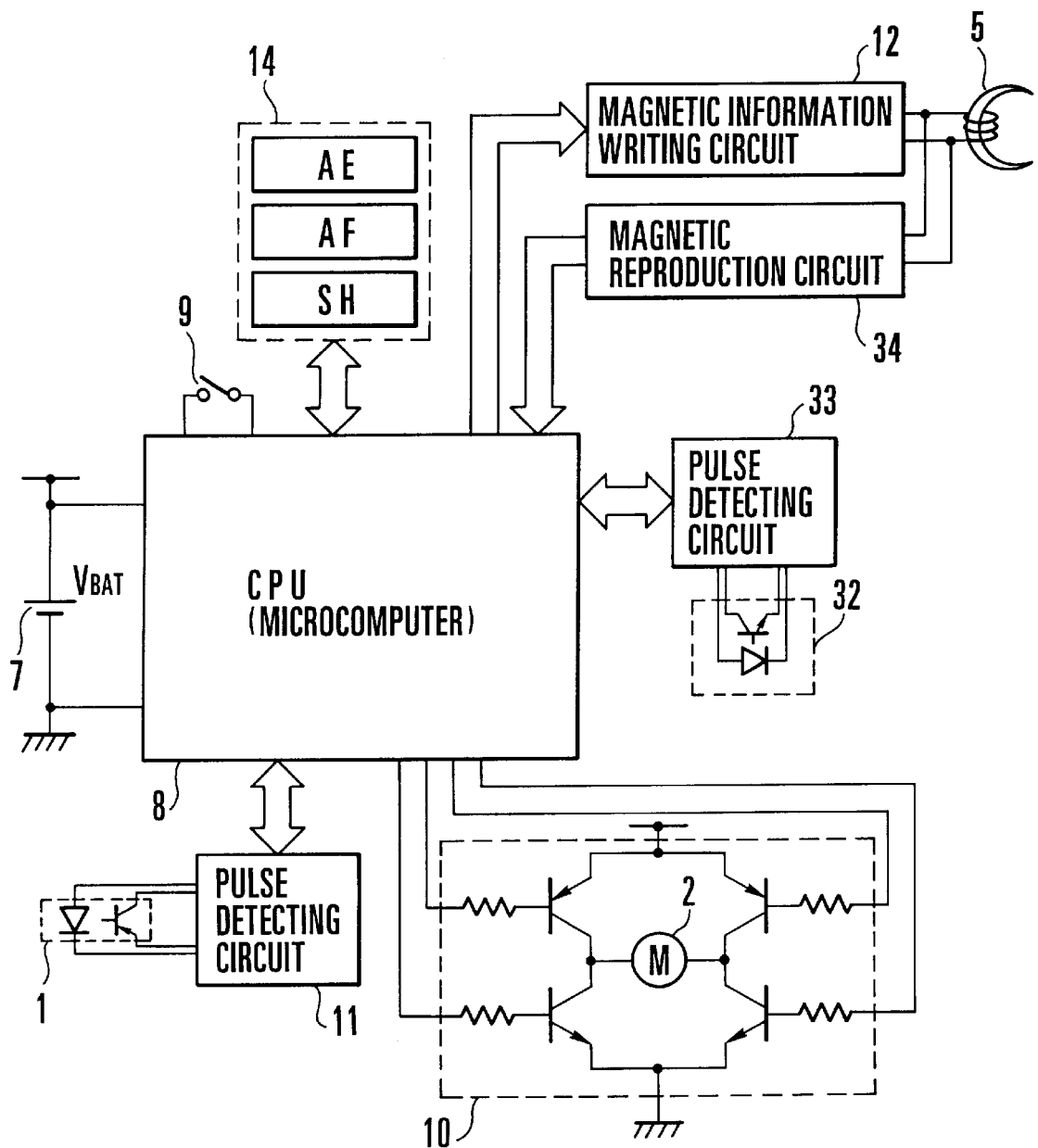
FIG. 8 is a block diagram showing the arrangement of an electric control system of the camera shown in FIG. 7.
Figure 9:
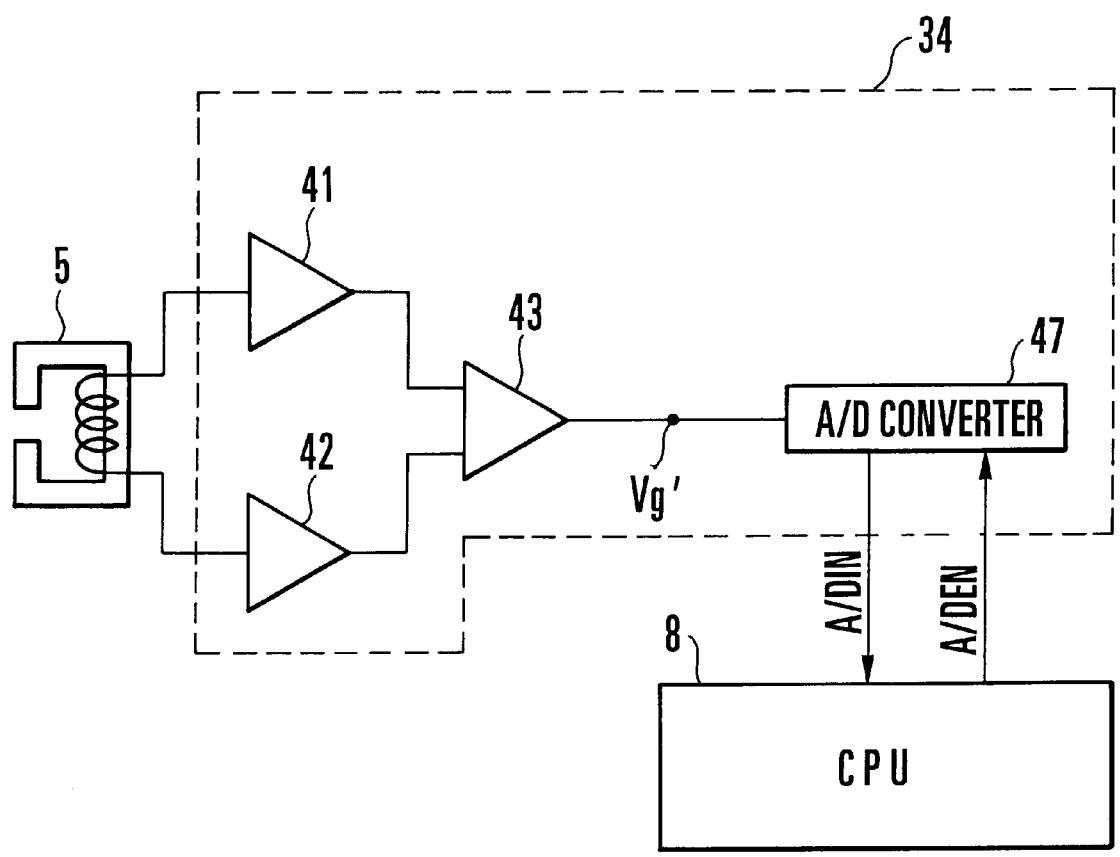
FIG. 9 is a block diagram showing the arrangement of a magnetic reproduction circuit shown in FIG. 8.
Figure 11:
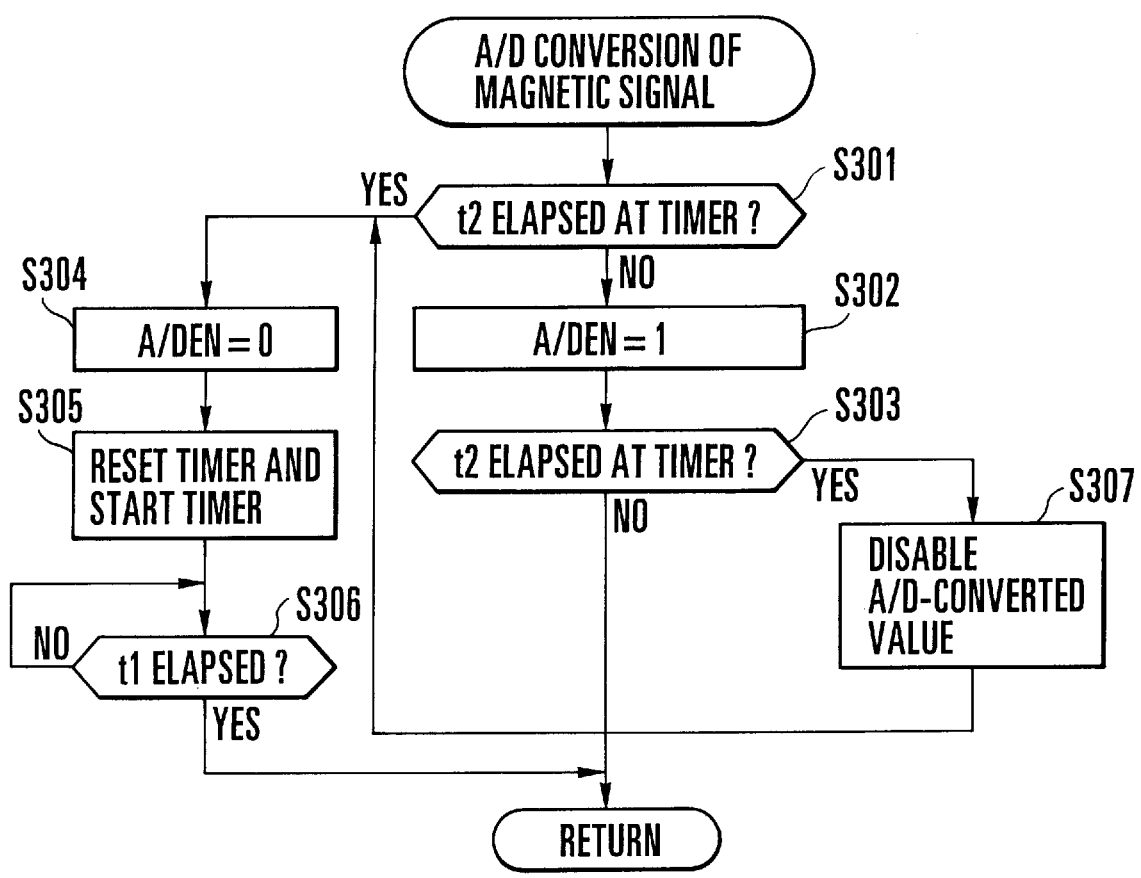
FIG. 11 is a flow chart showing an A/D converting action of a microcomputer 8 shown in FIG. 8.

FIGS. 7 to 11 are diagrams which relate to the second embodiment of the invention. FIG. 7 is an exploded perspective view showing some essential parts of a camera arranged as the second embodiment. FIG. 8 is a block diagram showing the arrangement of an electric control system of the camera shown in FIG. 7. FIG. 9 is a block diagram showing the arrangement of a magnetic reproduction circuit shown in FIG. 8. FIGS. 10(a) to 10(c) show waveforms of signals obtained at various parts of the magnetic reproduction circuit shown in FIG. 9. FIG. 11 is a flow chart showing an A/D converting action of a CPU (microcomputer) 8 shown in FIG. 8.

Referring to FIG. 7, a pulse disk 31 is mounted on the driving shaft of a film transport motor 2. For detecting the rotation phase of the film transport motor 2, the pulse disk 31 has a pattern appearing transparent on its one half side and black on the other half side. A photo-interrupter 32 is arranged to detect the rotation phase of the film transport motor 2 through the black-and-transparent pattern of the pulse disk 31. With the exception of these parts, all other parts of the second embodiment are arranged in the same manner and are indicated by the same reference numerals as those used in the first embodiment. The details of these same parts already described in the foregoing are omitted from the following description.

Referring to FIG. 8, a pulse detecting circuit 33 is arranged to turn the detection signal of the photo-interrupter 32 into a signal acceptable by the CPU 8. A magnetic reproduction circuit 34 is arranged to read out magnetic information recorded in a track T of the film F. Other parts of the second embodiment arranged in the same manner as in the first embodiment are indicated by the same reference numerals as in FIG. 2. The details of these same parts already described in the foregoing are omitted from the following description.

FIG. 9 shows in detail the magnetic reproduction circuit 34 shown in FIG. 8. Referring to FIG. 9, a magnetic signal recorded on the film F is reproduced and supplied from a magnetic head 5 to amplifiers 41 and 42 to be amplified there. The outputs of the two amplifiers 41 and 42 are sent to a differential amplifier 43. At the differential amplifier 43, the two magnetic signal inputs are processed to have their in-phase portions removed. The result of the process is amplified before it is outputted from the differential amplifier 43. The output Vg' of the differential amplifier 43 is A/D-converted by an A/D converter 47. The A/D conversion is allowed to be performed when an A/D conversion enabling signal A/DEN of the CPU 8 is at "1", and is inhibited when the signal A/DEN is at "0".

FIGS. 10(a) to 10(c) show waveforms of signals obtained at various parts of the magnetic reproduction circuit 34 shown in FIG. 9. In each of FIGS. 10(a) to 10(c), the abscissa axis shows time T. FIG. 10(a) shows the waveform of a magnetic signal which includes a noise caused by the motor while the film F is in process of being actually transported. FIG. 10(b) shows the waveform of an output of the photo-interrupter 32 which detects the rotation phase of the film transport motor 2 at timing corresponding to the timing of FIG. 10(a). FIG. 10(c) shows the A/D conversion enabling signal A/DEN of the CPU 8 obtained at the same timing.

In the case of FIG. 10(a), the noise of the film transport motor 2 is mixed in a pulse-like shape in the magnetic signal Vg' which is an output of the differential amplifier 43. This pulse-like noise results from a change in a magnetic flux caused by the rotation of the motor 2 and is in synchronism with the rotation phase of the motor 2. Although it depends on the number of poles, the magnetic flux is assumed in this case to change twice per one rotation of the shaft of the motor 2. The noise appears in the waveform of the magnetic signal Vg' of FIG. 10(a) after the lapse of a predetermined period of time t2 from a point of time at which the level of the signal outputted from the photo-interrupter 32 changes, for example, from a low level to a high level, as shown in FIG. 10(b).

Therefore, the CPU 8 predicts that the noise of the film transport motor 2 takes place approximately a fixed length of time t2 after the timing of the change of the signal outputted from the photo-interrupter 32. Accordingly, the CPU 8 controls the A/D conversion enabling signal A/DEN in such a way as to inhibit the A/D conversion for the predetermined period of time t1. More specifically, the A/D conversion is inhibited for a predetermined period of time (the time t1) approximately after the lapse of the period of time t2 from the changing timing of the signal outputted from the photo-interrupter 32. With the motor noise portion of the signal thus arranged to be not A/D-converted, the signal portion assumed to include the motor noise is discarded to use only the standard deviation of the A/D-converted values of the normal signal for accurate detection of magnetic information. Therefore, unexposed frames of the film are effectively prevented from being misjudged, by virtue of this arrangement.

A flow of operation to be performed for the A/D conversion in the second embodiment is next described with reference to FIG. 11. Steps of procedures to be taken up to a point where a film cartridge is automatically set in a photographable frame position after the camera is loaded with the film cartridge are the same as the steps of the first embodiment shown in the flow chart of FIG. 5. In the case of the second embodiment, however, an interruption process for monitoring the timing of change in the signal outputted from the photo-interrupter 32 must be allowed at the step 105 in addition to driving the film transport motor 2. Therefore, after the step S105, the timer is started by an interruption process for any change in the signal outputted from the photo-interrupter 32, and then, after the lapse of the predetermined period of time t2, the A/D conversion is inhibited. The details of A/D conversion to be performed in this case are described below referring to the flow chart of FIG. 11.

At a step S301 shown in FIG. 11, the time count of the timer started by the interruption process is checked for the lapse of the predetermined period of time t2. The check is made to find a length of time having elapsed after the timing of a change having occurred in the signal outputted from the photo-interrupter 32. In other words, the check is made for occurrence of a motor noise. If the period of time t2 is found to have elapsed thus indicating the existence of a noise, the flow proceeds to a step S304. At the step S304, the signal A/DEN is set to "0". At the next step S305, the timer is reset and, after that, the timer is restarted. At a step S306, the A/D conversion is inhibited for the predetermined period of time t1. After that, the flow comes to an end.

If the period of time t2 is found at the step S301 not to have elapsed, thus indicating a normal reproduced signal having no noise, the flow proceeds to a step S302. At the step S302, the signal A/DEN is set to "1" and the reproduced signal Vg' is A/D-converted.

At the next step S303, a check is made to find if the period of time t2 has elapsed. If not, the flow comes to an end without any further step. If so, a noise is determined to be existing, and the flow proceeds to a step S307. At the step S307, the A/D-converted value obtained at the step S302 is disabled, and the flow proceeds to the step S304. At the step S304, the A/D conversion is inhibited for the predetermined period of time t1. The flow of operation then comes to an end.

In the second embodiment, as described above, the A/D conversion is inhibited for the predetermined period of time t1, during which a noise takes place, after the lapse of the predetermined period of time t2 from the change of the detection signal of the photo-interrupter 32 which detects the rotation phase of the film transport motor 2, as shown at the steps S304, S305 and S306, or the A/D-converted value obtained at the step S302 is disabled as shown at the step S307. Since any reproduced signal that includes a motor noise is thus never accepted as an A/D-converted value, unexposed frames of the film are effectively prevented from being misjudged.

A third embodiment of the invention is next described.

Figure 12:
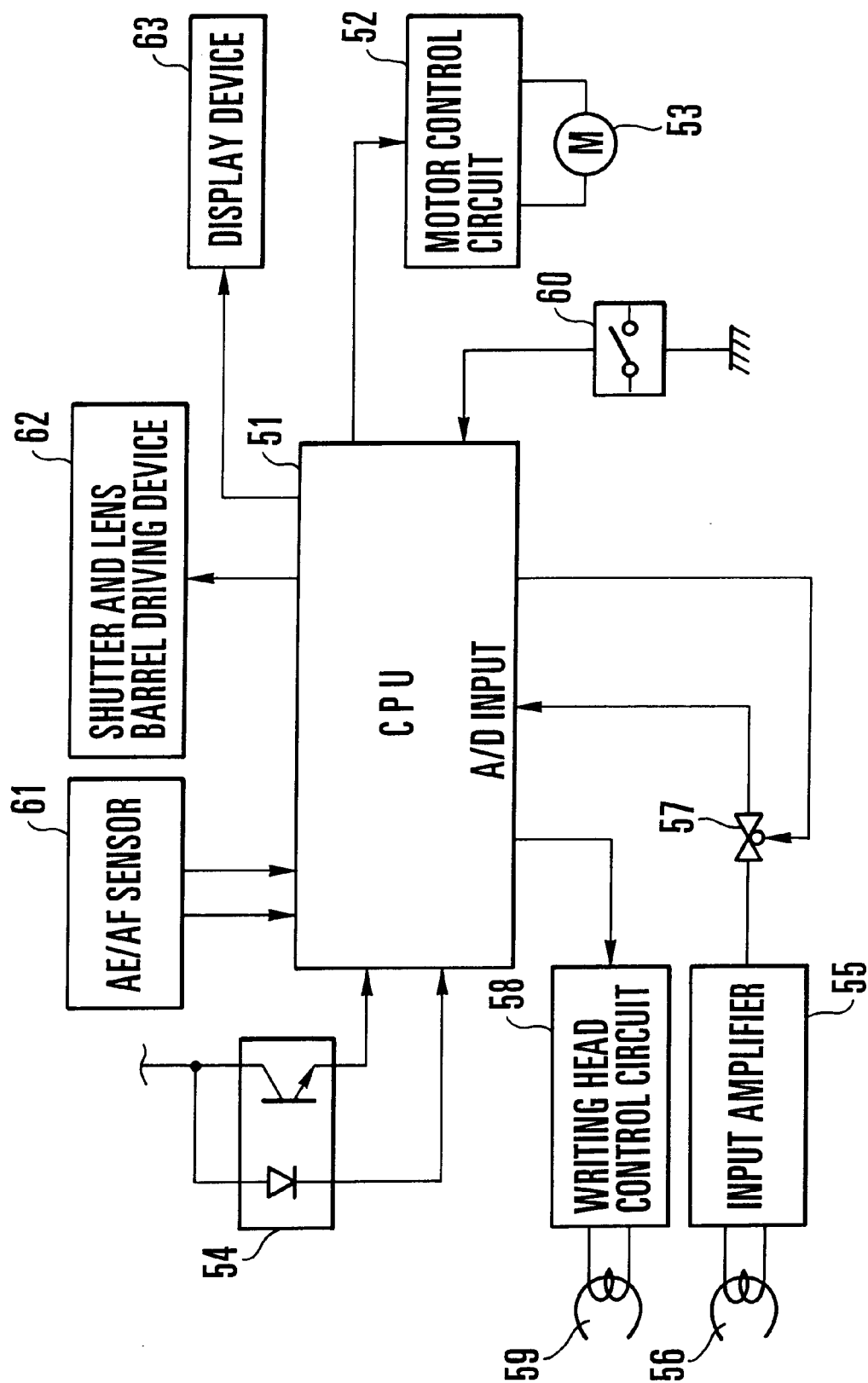
FIG. 12 is a block diagram showing a camera arranged as a third embodiment of the invention.

FIG. 12 is a block diagram showing the arrangement of a camera according to the third embodiment of the invention.

Referring to FIG. 12, a CPU (central processing unit) 51 is arranged to control the whole camera. A motor control circuit 52 is arranged to control a film transport motor 53. A photo-reflector 54 is arranged to detect perforations provided in the film and to find the timing of writing and reading magnetic data.

An analog amplifier 55 is arranged to amplify a signal obtained by converting into an electrical signal the magnetic data which is written in a magnetic recording part of the film and is read out from there by a magnetic head 56 and to supply the amplified signal to an A/D input port of the CPU 51. A gate device 57 is arranged to open and close a line between the analog amplifier 55 and the CPU 51 in synchronism with control over the motor 53. A writing head control circuit 58 is arranged to control a magnetic head 59. The magnetic head 59 is arranged to write information about the photo-taking conditions, etc., of the camera into the magnetic recording part of the film. A switch group 60 is provided for causing the camera to perform a sequence of actions or to give conditions necessary for the actions to the camera. An AE/AF sensor 61 is arranged to supply the CPU 51 with data of measured light of an object to be photographed and data of measured distance to the object. A shutter and lens barrel driving device 62 is arranged to move a lens barrel to a position corresponding to the data of measured distance and then to drive a shutter to give an exposure amount corresponding to the data of measured light on the basis of the results of computing operations on data of measuring actions. A display device 63 is composed of an LCD, an LED, etc.

Figure 13:
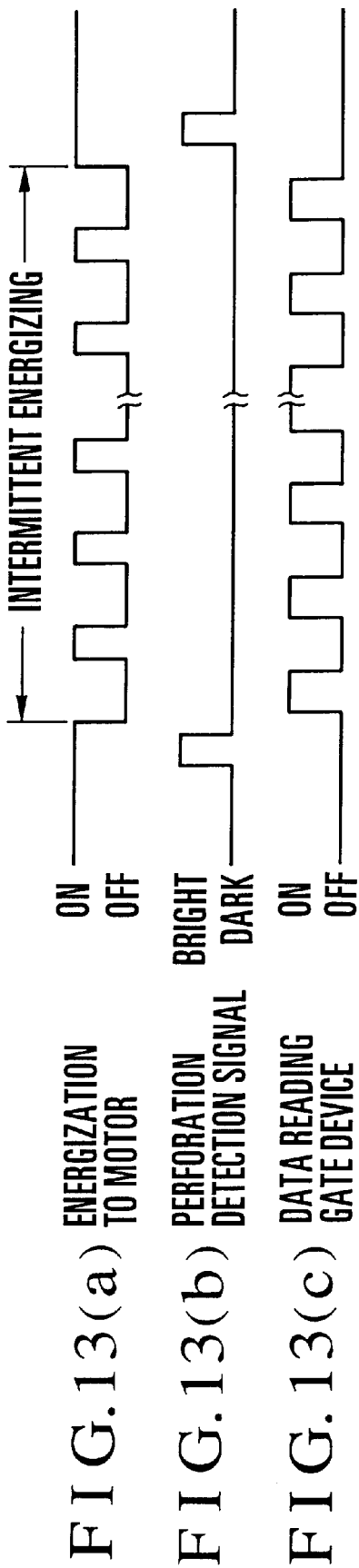
FIGS. 13(a) to 13(c) show in a timing chart the timing of energization to a film transport motor and the timing of data reading in the camera shown in FIG. 12.

FIGS. 13(a), 13(b) and 13(c) show in a time sequence chart a driving action on the film transport motor 53 of the camera shown in FIG. 12 and the timing of reproduction of magnetic data in synchronism with the motor driving action.

Referring to FIGS. 13(a), 13(b) and 13(c), when the film is transported by applying a current to the film transport motor 53, the photo-reflector 54 shown in FIG. 12 outputs a perforation detection signal as shown in FIG. 13(b). The current is intermittently applied to the film transport motor 53 during a period between the first occurrence of the perforation detection signal and the next occurrence of the perforation detection signal, as shown in FIG. 13(a).

The data-reading gate device 57 shown in FIG. 12 is opened and closed in synchronism with the intermittent application of current to the film transport motor 53, as shown in FIG. 13(c). Thus, only when the supply of current to the film transport motor 53 is off, is the data-reading gate device 57 opened to allow the signal of the input amplifier 55 to be sent to the CPU 51 shown in FIG. 12.

Figure 14:
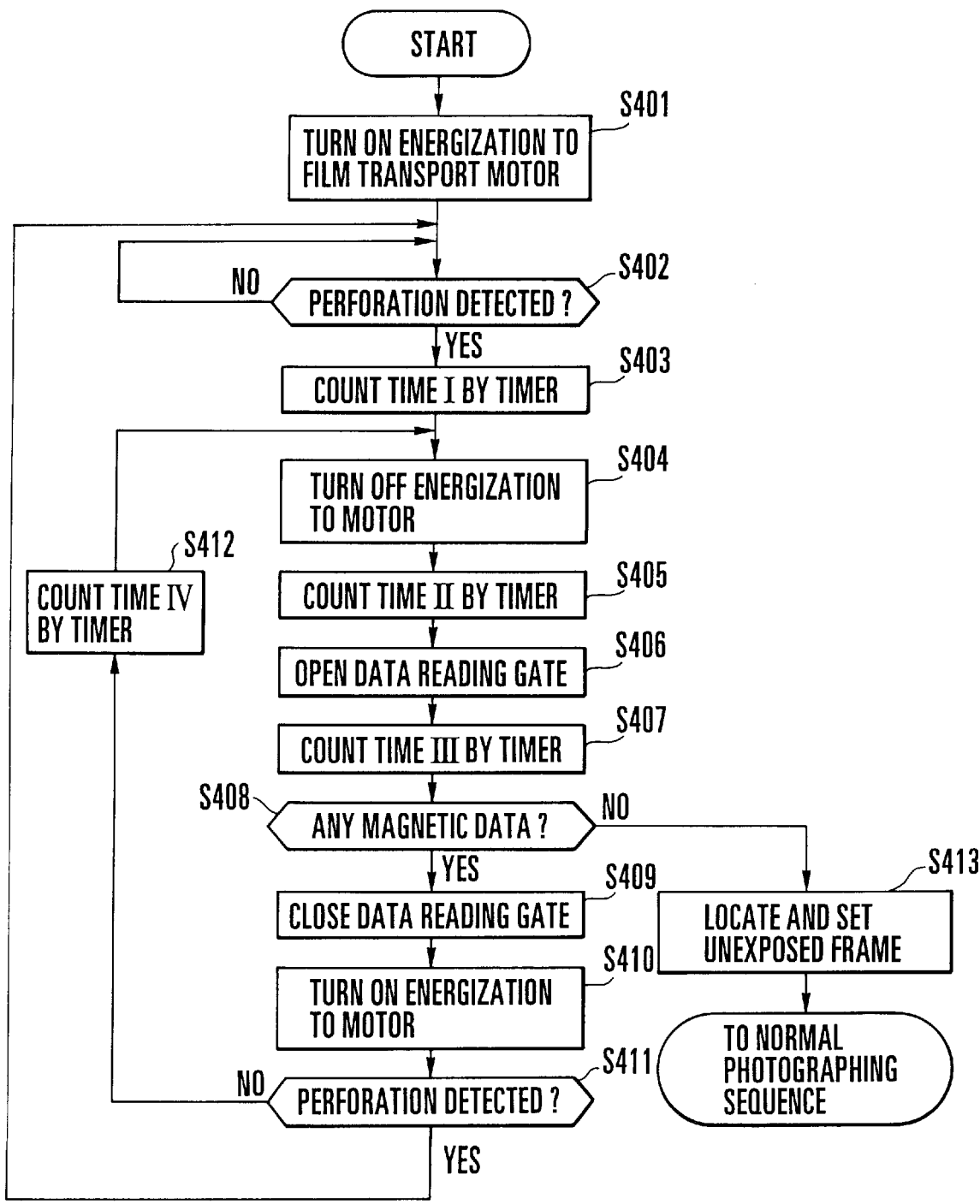
FIG. 14 is a flow chart showing an operation of a CPU 51 included in the camera shown in FIG. 12.

FIG. 14 shows in a flow chart a magnetic data reading operation of the CPU 51 of the camera shown in FIG. 12. The magnetic data reading operation is performed as described below.

Referring to FIG. 14, the flow of the magnetic data reading operation starts with the camera rendered operative and loaded with a film which has been partially used for photography (magnetic data has been recorded up to a frame position which was used until the film cartridge was most lately taken out from the camera). The camera then reads film cartridge data or information, including the partial use of the film cartridge, the ISO sensitivity value, etc. At a step S401, a current begins to be supplied to the film transport motor 53 shown in FIG. 12.

When the film begins to be transported, the flow of operation proceeds to a step S402. At the step S402, a check is made to find if a perforation provided in the film is detected by the photo-reflector 54. If so, the flow proceeds to a step S403. At the step S403, a timer disposed inside the CPU 51 is caused to count a predetermined length of time I. At a step S404, the supply of current to the film transport motor 53 is turned off after completion of the time count of the predetermined length of time I. At the next step S405, the timer within the CPU 51 is caused to count another predetermined length of time II which is necessary before a magnetic induction noise of the film transport motor 53 comes to settle down. After completion of the time count of the predetermined length of time II, the flow proceeds to a step S406. At the step S406, the data-reading gate device 57 shown in FIG. 12 is opened. At a step S407, the timer within the CUP 51 is caused to count a predetermined length of time III, and the output of the input amplifier 55 is supplied to the A/D input terminal of the CPU 51 during the time count of the predetermined length of time III.

At a step S408, a check is made to find if there is any magnetic data supplied through the gate device 57 which is opened during the time count of the predetermined length of time III. If so, the flow proceeds to a step S409 to cause the data-reading gate device 57 to close after completion of the time count of the predetermined length of time III. At the next step S410, the supply of current to the film transport motor 53 is again turned on to transport the film. At a step S411, a check is made to find if the next perforation of the film is detected by the photo-reflector 54. If so, the flow returns to the step S402 to check the first perforation of the next frame, and repeats the sequence until a frame having no magnetic data recorded is detected. If not, the flow proceeds to a step S412 to cause the timer within the CPU 51 to count a further predetermined length of time IV. After that, the flow returns to the step S404 to repeat the sequence of the steps mentioned above.

If no magnetic data is found at the step S408, the flow proceeds to a step S413. In this instance, the current position of the film is considered to be at a frame located next to the last exposed frame at which the film cartridge was last taken out. At the step S413, an unexposed frame position of the film is indexed and set on the camera. After the step S413, the flow of operation shifts to a normal photographing sequence to permit a further photo-taking operation on the film.

As described above, according to the third embodiment of the invention, a current is supplied intermittently to the film transport motor at the timing of reading magnetically recorded data on the film, and the magnetically recorded data is reproduced within a period during which the supply of current to the film transport motor is turned off. Therefore, according to the third embodiment, the magnetically recorded data can be reproduced with an excellent S/N ratio without being affected by any magnetic induction noise of the motor that is induced to the magnetic head.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in the first embodiment of the invention, two comparators 24 and 25, shown in FIG. 3, are used for detecting both positive and negative signals in determining a magnetic signal. This arrangement, however, may be changed to determine only one of the signals according to the characteristic of the noise. This modification dispenses with the NAND gate 26 and thus permits omission of one comparator and one NAND gate, although this modification of course necessitates a signal processing process for inverting the logic of determination.

The process for A/D-converting the reproduced magnetic signal shown at the step S106 in the flow chart of FIG. 5 is arranged to be carried out to use only the A/D-converted value of a normal reproduced magnetic signal by discarding the A/D-converted value of any reproduced signal that includes a noise, in the search for unexposed frames, as shown in the subroutine of FIG. 6. For this purpose, the first embodiment is arranged to sequentially check the signal NOISE. This arrangement may be changed to allow an interruption process, at the step S105 of FIG. 5, in such a way as to inhibit the A/D conversion for the predetermined period of time t1 by an interrupting process routine when the state of the signal NOISE is found to have changed from "0" to "1" under a constant monitoring action on the signal NOISE. In other words, an interruption process may be set like in the case of the second embodiment disclosed. In the second embodiment, the interruption is allowed at the step S105 at the timing of a change taking place in the signal outputted from the photo-interrupter 32, a check is made for the lapse of the predetermined period of time t2, and, after that, the A/D conversion is inhibited for the predetermined period of time t1, as shown in the flow chart of FIG. 11. In the case of the first embodiment, on the other hand, the interruption is allowed, at the timing of a change of the signal NOISE from "0" to "1", to inhibit the A/D conversion for the predetermined period of time t1. As will be understood from the above description, while the arrangement of the second embodiment is mainly aimed at concentrative removal of a periodical motor noise, the arrangement of the first embodiment enables the camera to effectively cope with noises other than the noise of the film transport motor, such as a nonperiodic oscillation noise taking place within the camera, a strong noise coming from some external noise source, etc.

Further, the third embodiment of the invention disclosed is arranged to intermittently supply a current to the film transport motor and to reproduce the magnetic data recorded on the film while the film is being transported by the inertial rotation of the film transport motor within the period during which the supply of current to the motor is turned off, so that the data can be read out with an excellent S/N ratio in a state of not being affected by the magnetic induction noise of the film transport motor. However, a method for improving the S/N ratio adaptable in accordance with the invention is not limited to the above-stated arrangement. Any other arrangement can be made within the scope of the invention as long as it permits improvement in S/N ratio by controlling the motor at the timing of reading the magnetic data.

The invention is applicable not only to a case where data recorded in the magnetic recording part of a film is to be reproduced, as in the cases of embodiments disclosed, but also to a case where data is to be recorded in the magnetic recording part of a film.

The invention is applicable even to a case where information is to be recorded on or read out from a film by an electronic method, an optical method or the like, other than a magnetic method.

The invention is applicable not only to the film of the kind used in the embodiments disclosed but to films of other kinds and also to image recording media other than films.

The software and hardware arrangements of each embodiment disclosed may be interchanged as desired.

The invention may be carried out by combining as necessary the embodiments or their technological elements described in the foregoing.

The invention applies to cases where either the whole or a part of claims or the arrangement of each of embodiments disclosed forms one apparatus or is used in combination with some other apparatus or as a component element of an apparatus.

Further, the invention is applicable to apparatuses of various kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. An apparatus adapted to a film having a magnetic recording part, said apparatus comprising:

(A) a reproducing device which reproduces a signal recorded on the magnetic recording part of the film;

(B) a signal processing device for causing said reproducing device not to reproduce the signal;

(C) a motor which transports said film;

(D) a detection circuit which detects a rotational phase of said motor being rotating; and (E) a control circuit which activates said signal processing device when the phase detected by said detection circuit is a predetermined phase.

2. An apparatus according to claim 1, wherein the predetermined phase is a phase in which a noise from said motor has influence on said reproducing device.

3. An apparatus according to claim 1, wherein said control circuit includes a timer for causing said reproducing device not to reproduce the signal after a predetermined period of time from detection of a predetermined rotational phase of said film transport motor by said detection circuit.

4. An apparatus according to claim 1, wherein said control circuit includes a timer for causing said reproducing device not to reproduce the signal for a first predetermined period of time after a second predetermined period of time from detection of a predetermined rotational phase of said film transport motor by said detection circuit.

5. An apparatus according to claim 1, wherein said control circuit includes a timer for causing said reproducing device not to reproduce the signal for a predetermined period of time from detection of a predetermined rotational phase of said film transport motor by said detection circuit.

6. An apparatus according to claim 1, wherein said signal processing device includes determination means for determining whether a particular frame of the film is a used frame, on the basis of the signal reproduced by said reproducing device in which the predetermined signal is not included.

7. An apparatus according to claim 1, wherein said apparatus includes a camera.

8. An apparatus adapted to a film having a magnetic recording part, said apparatus comprising:

(A) a reproducing device which reproduces a signal recorded on the magnetic recording part of the film;

(B) a signal processing device for disabling the signal reproduced by said reproducing device;

(C) a motor which transports said film;

(D) a detection circuit which detects a rotational phase of said motor being rotating; and (E) a control circuit which activates said signal processing device when the phase detected by said detection circuit is a predetermined phase.

9. An apparatus according to claim 8, wherein said predetermined phase is a phase in which a noise from said motor has influence on said reproducing device.

10. An apparatus according to claim 9, wherein said control circuit includes a timer for disabling the signal reproduced by said reproducing device after a predetermined period of time from detection of a predetermined rotational phase of said film transport motor by said detection circuit.

11. An apparatus according to claim 8, wherein said control circuit, includes a time for disabling the signal reproduced by said reproducing device for a first predetermined period of time after a second predetermined period of time from detection of a predetermined rotational phase of said film transport motor by said detection circuit.

12. An apparatus according to claim 8, wherein said control circuit includes a time for disabling the signal reproduced by said reproducing device for a predetermined period of time from detection of a predetermined rotational phase of said film transport motor by said detection circuit.

13. An apparatus according to claim 8, wherein said signal processing device includes determination means for determining whether a particular frame of the film is a used frame, on the basis of a signal reproduced by said reproducing device in which the predetermined signal is not included.

14. An apparatus according to claim 8, wherein said apparatus includes a camera.

* * * * *